United States Patent
Hoshika

(10) Patent No.: US 9,407,825 B2
(45) Date of Patent: Aug. 2, 2016

(54) IMAGING APPARATUS, IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hiroyuki Hoshika, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/578,182

(22) Filed: Dec. 19, 2014

(65) Prior Publication Data

US 2015/0189122 A1  Jul. 2, 2015

(30) Foreign Application Priority Data

Dec. 27, 2013 (JP) ................. 2013-272051

(51) Int. Cl.
*H04N 5/225* (2006.01)
*H04N 5/232* (2006.01)
*H04N 5/272* (2006.01)

(52) U.S. Cl.
CPC ......... *H04N 5/23293* (2013.01); *H04N 5/2258* (2013.01); *H04N 5/272* (2013.01)

(58) Field of Classification Search
USPC ........................................................ 348/239
See application file for complete search history.

(56) References Cited

U.S. PATENT DOCUMENTS

| | | | | |
|---|---|---|---|---|
| 6,512,793 B1 * | 1/2003 | Maeda | ............... | H04N 19/70 348/585 |
| 2005/0259173 A1* | 11/2005 | Nakajima | .......... | H04N 1/32101 348/333.12 |
| 2006/0139463 A1* | 6/2006 | Heinonen | ............ | H04N 5/2251 348/239 |
| 2008/0258897 A1* | 10/2008 | Itoh | ....................... | B60K 35/00 340/461 |
| 2012/0262594 A1* | 10/2012 | Koizumi | ............ | H04N 13/0014 348/218.1 |

FOREIGN PATENT DOCUMENTS

JP          6-165029 A       6/1994

* cited by examiner

*Primary Examiner* — Roberto Velez
*Assistant Examiner* — Stephen Coleman
(74) *Attorney, Agent, or Firm* — Canon USA Inc. IP Division

(57) ABSTRACT

An imaging apparatus in which a composite image and composite information are reproduced from a recording medium, an image acquired by a second imaging unit is extracted from the composite image based on the reproduced composite information, and information for displaying the extracted image acquired by the second imaging unit is generated.

18 Claims, 9 Drawing Sheets

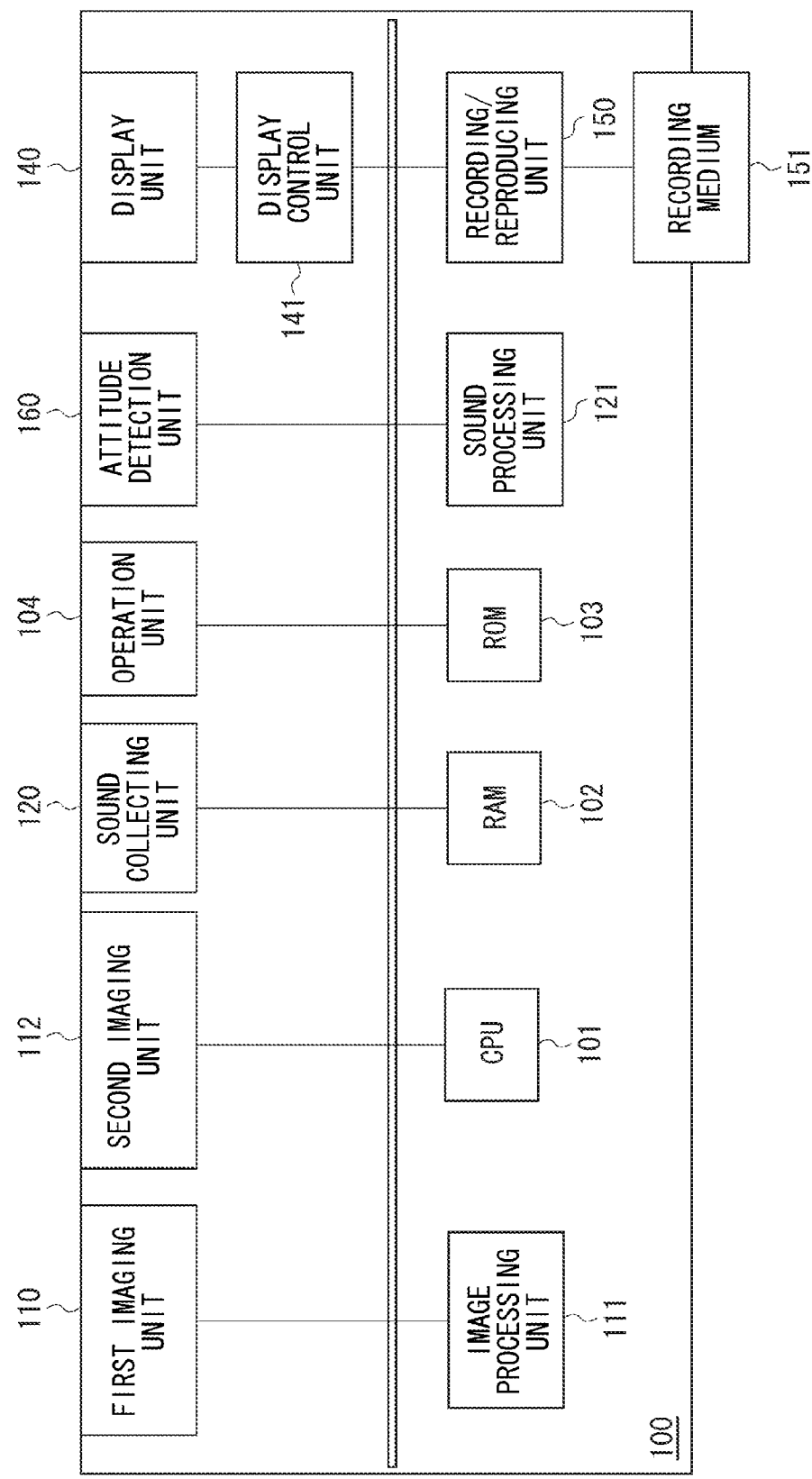

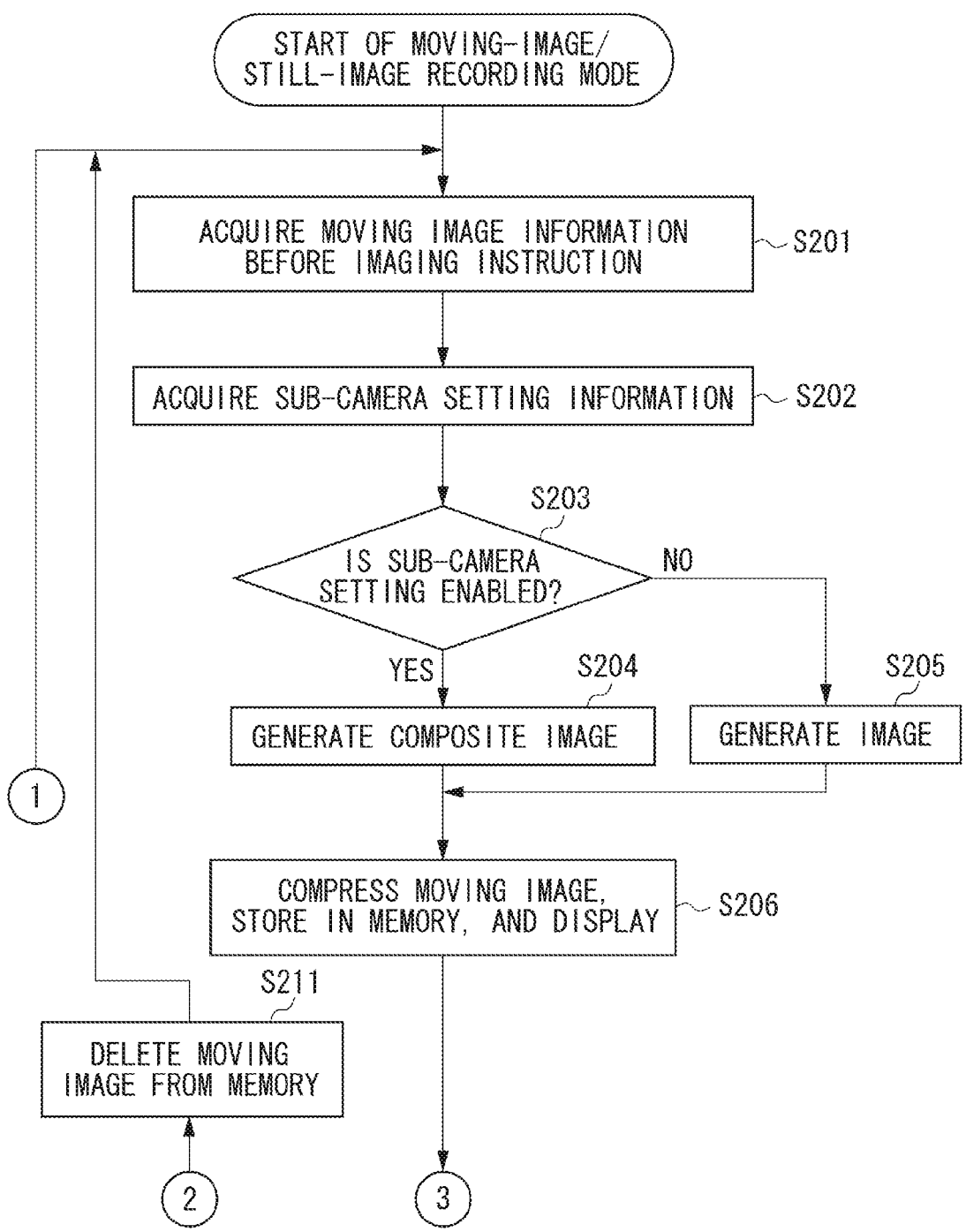

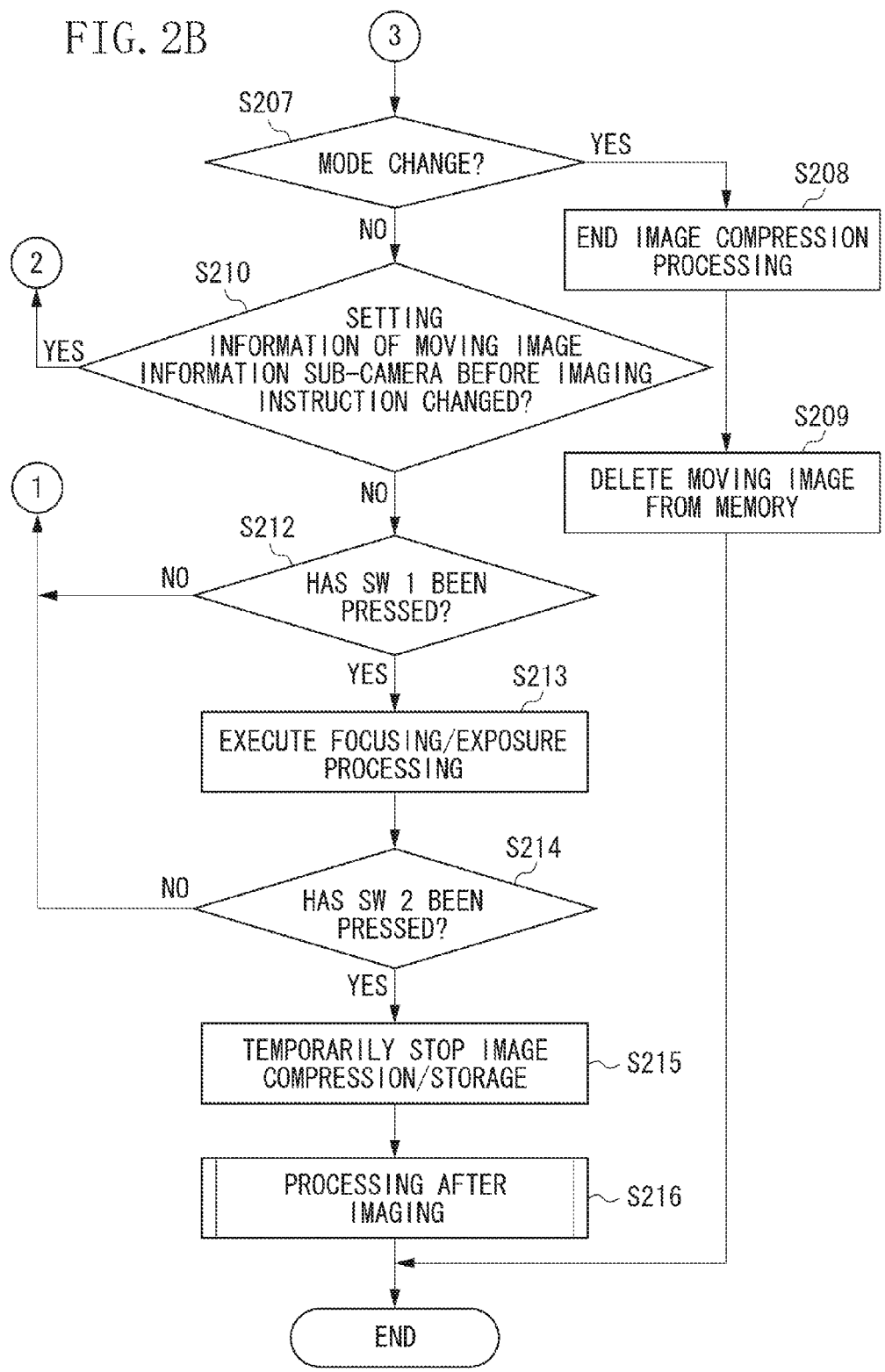

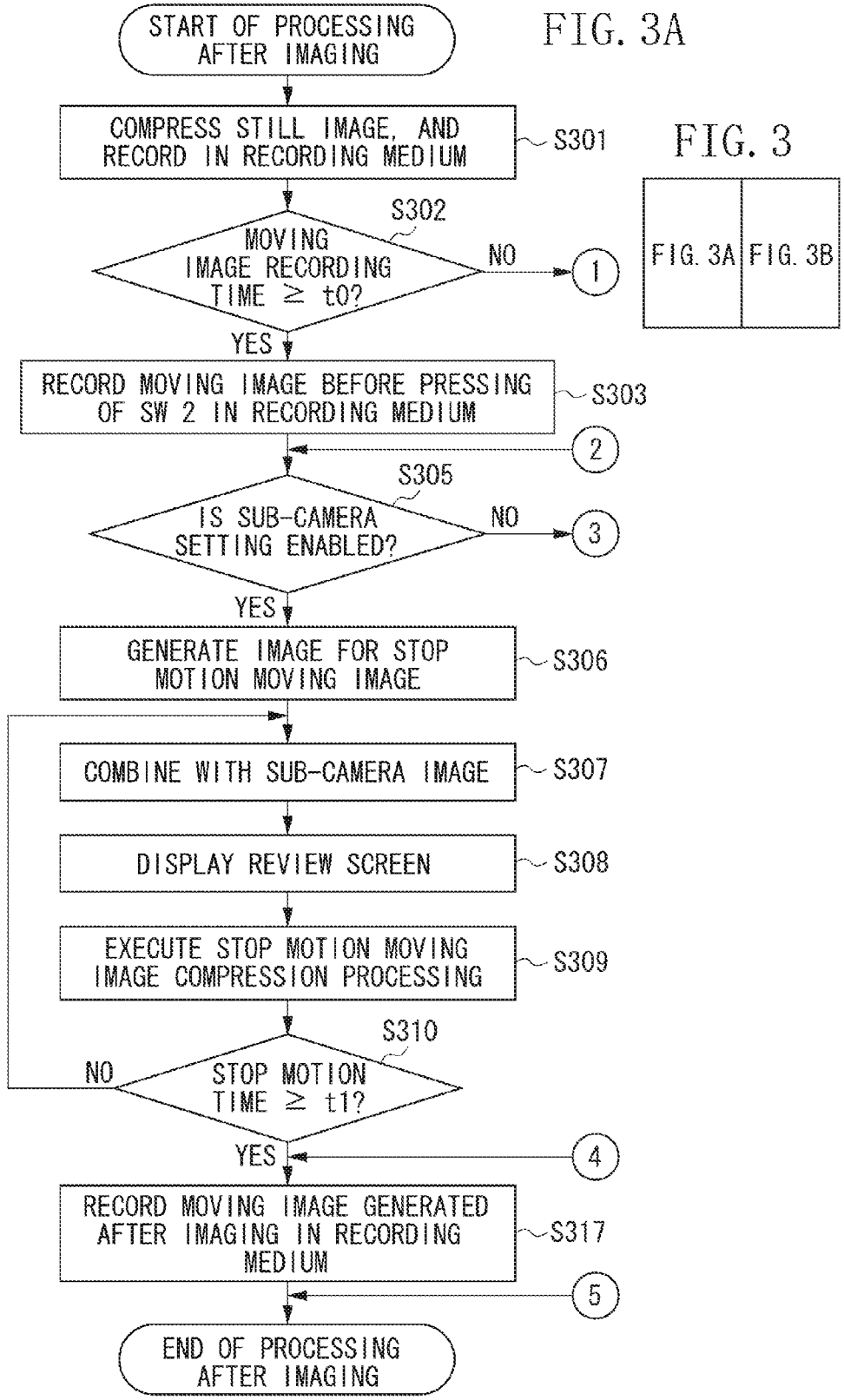

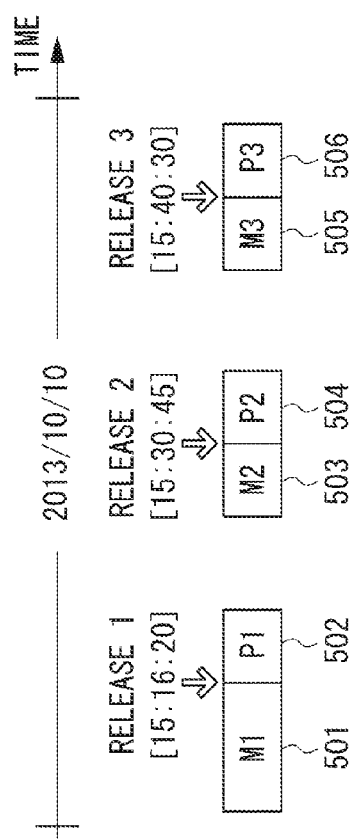
FIG. 5A DATA
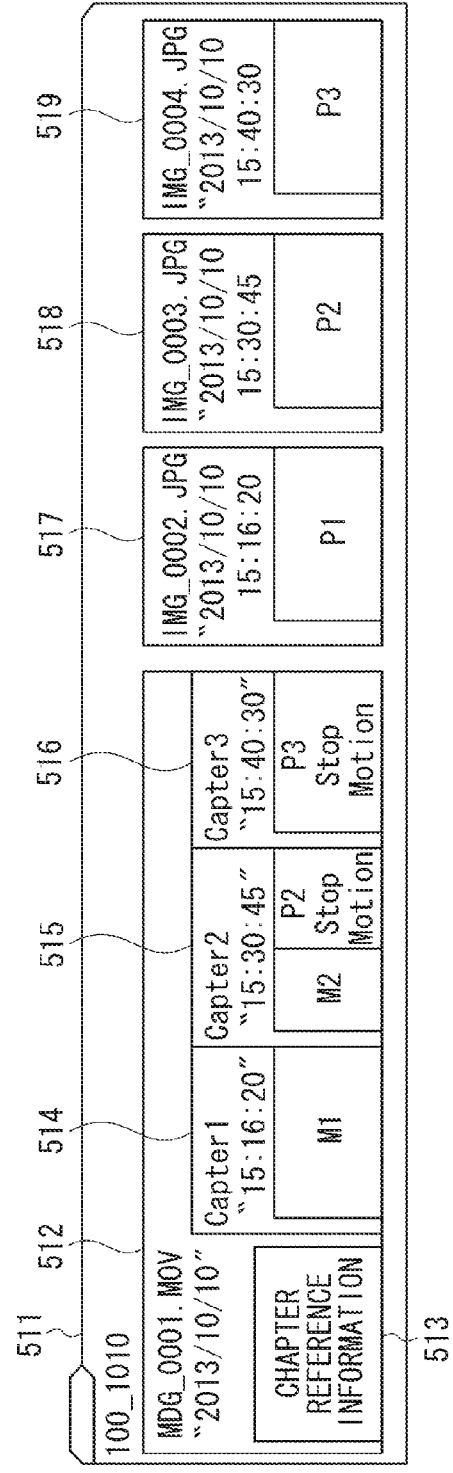
FIG. 5B RECORDING STATE

FIG. 5C CHAPTER REFERENCE INFORMATION

| Movie FileSize | Movie Total Frame |
|---|---|
| xxxxxByte | 540 |

| Chapter Num | Capture Time | Start Frame | Frame Count | Sub Movie XYWH | Stop Motion |
|---|---|---|---|---|---|
| 1 | 2013/10/10 15:16:20 | 0 | 180 | 0, 0, 0, 0 | 0-0 |
| 2 | 2013/10/10 15:30:45 | 180 | 180 | 640, 540, 160, 90 | 90-179 |
| 3 | 2013/10/10 15:40:30 | 360 | 180 | 640, 540, 160, 90 | 0-179 |

IMAGING APPARATUS, IMAGE PROCESSING APPARATUS, IMAGE PROCESSING METHOD, AND STORAGE MEDIUM

BACKGROUND OF THE INVENTION

1. Field of the Invention

The present disclosure generally relates to image processing and, more particularly, to an imaging apparatus, an image processing apparatus, an image processing method, and a storage medium.

2. Description of the Related Art

There is known, as an image processing apparatus, a digital camera for recording image data acquired by capturing an image of an object as a still image or a moving image in a recording medium. Japanese Patent Application Laid-Open No. 6-165029 discusses a digital camera that includes, one each, an imaging unit configured to perform imaging in an object direction and an imaging unit configured to perform imaging in a photographer direction, and can generate and record an image by combing the images acquired by the imaging units.

SUMMARY OF THE INVENTION

The present disclosure has been made in consideration of the aforementioned problems, and realizes an image processing apparatus that can extract, even when images acquired by a first imaging unit and a second imaging unit are combined to be recorded, only the image captured by the second imaging unit to display the image.

According to an aspect of the present disclosure, an imaging apparatus includes a first imaging unit, a second imaging unit, a combining unit configured to generate a composite image by combining a first image captured by the first imaging unit and a second image captured by the second imaging unit, a recording unit configured to record the composite image generated by the combining unit and composite information regarding the combining of the first image and the second image in a recording medium, and a display control unit configured to perform control for displaying the image recorded in the recording medium on a display unit, wherein the display control unit performs control to extract the second image from the composite image and display the extracted second image, based on the composite information.

According to another aspect of the present disclosure, a control apparatus includes a reading unit configured to read a composite image and composite information regarding the composite information from a recording medium, the composite image having been recorded in the recording medium by an imaging apparatus including a first imaging unit and a second imaging unit, and having been generated by combining a first image captured by the first imaging unit and a second image captured by the second imaging unit, and a display control unit configured to perform control to display the image read from the recording medium on a display unit, wherein the display control unit performs control to extract the second image from the composite image and display the extracted second image, based on the composite information.

According to another aspect of the present disclosure, a method for controlling an imaging apparatus includes a first imaging unit and a second imaging unit, the method including generating a composite image by combining a first image captured by the first imaging unit and a second image captured by the second imaging unit, recording the generated composite image and composite information regarding the combining of the first image and the second image in a recording medium, and performing control for displaying the image recorded in the recording medium on a display unit, wherein the control is performed to extract the second image from the composite image and display the extracted second image, based on the composite information.

According to another aspect of the present disclosure, a method for controlling a reproduction apparatus includes reading a composite image and composite information regarding the composite image from a recording medium, the composite image having been recorded in the recording medium by an imaging apparatus including a first imaging unit and a second imaging unit and having been generated by combining a first image captured by the first imaging unit and a second image captured by the second imaging unit, and performing control to display the image read from the recording medium, wherein the control is performed to extract the second image from the composite image and display the extracted second image, based on the composite information.

Further features of the present disclosure will become apparent from the following detailed description of exemplary embodiments with reference to the attached drawings.

BRIEF DESCRIPTION OF THE DRAWINGS

FIG. 1 is a block diagram illustrating a configuration of an imaging apparatus according to an exemplary embodiment.

FIGS. 2A and 2B are flowcharts illustrating an operation of a moving-image/still-image capturing mode according to the present exemplary embodiment.

FIGS. 3A and 3B are flowcharts illustrating an operation of the moving-image/still-image capturing mode according to the present exemplary embodiment.

FIGS. 5A to 5C are diagrams each illustrating data recorded in the moving-image/still-image capturing mode.

DESCRIPTION OF THE EMBODIMENTS

Figure 3B:
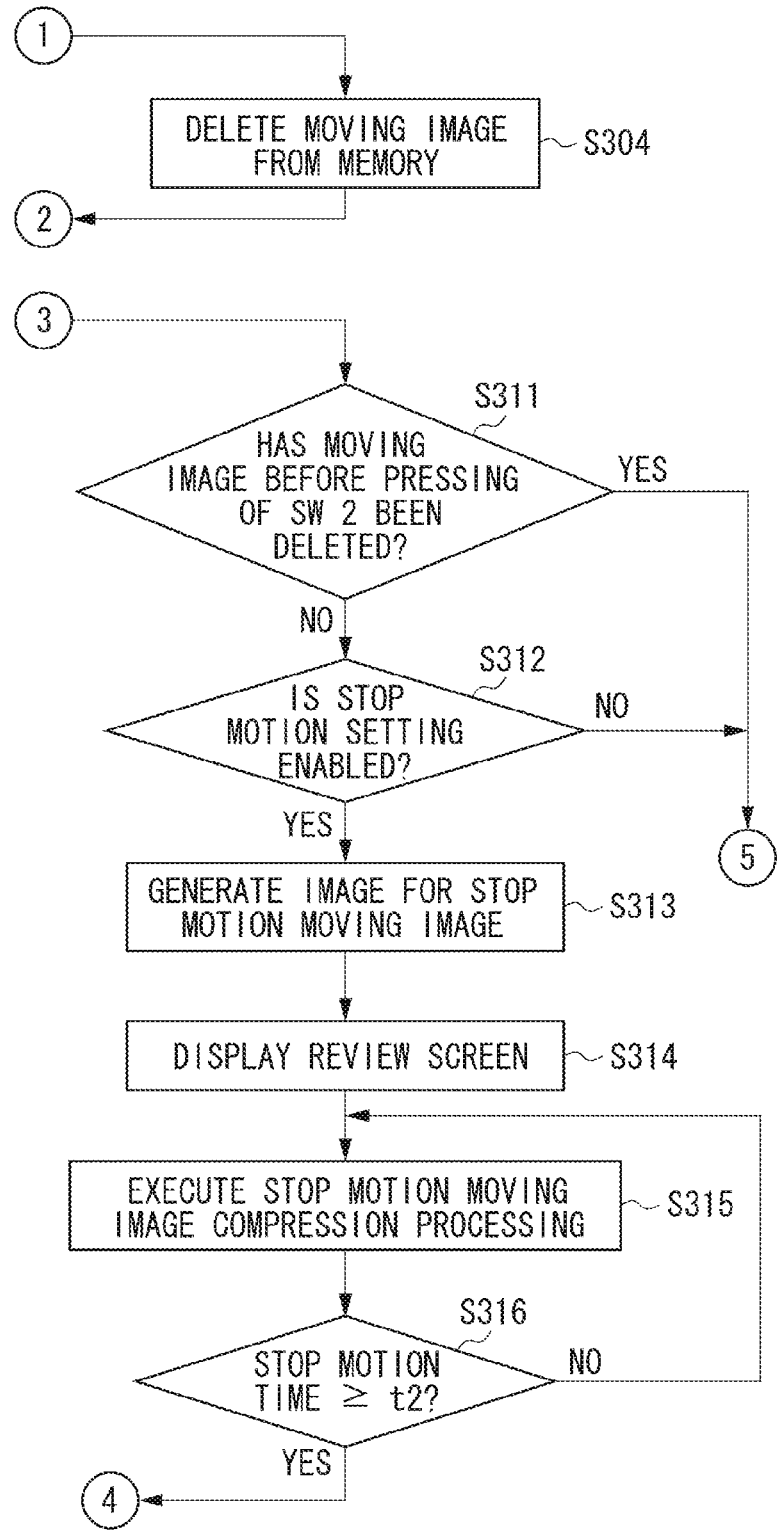

Various exemplary embodiments, features, and aspects of the disclosure will be described in detail below with reference to the drawings. However, the present disclosure is not limited to the exemplary embodiments described below. The exemplary embodiments described below are in no way limitative of the present disclosure, nor are all the combinations of the features of the exemplary embodiments essential to solutions.

Each functional block of the present exemplary embodiment is not necessarily configured with an individual hardware unit. In other words, for example, functions of some functional blocks may be executed by one hardware unit. A function of one functional block or functions of a plurality of functional blocks may be executed by a cooperative operation of some hardware units. Further, the function of each functional block may be executed based on a computer program loaded into a memory by a central processing unit (CPU). As used herein, the term "unit" generally refers to any combination of software, firmware, hardware, or other component, such as circuitry, that is used to effectuate a purpose.

In the present exemplary embodiment, an imaging apparatus will be described as an example of an image processing apparatus. However, any apparatus can be employed as long as the apparatus can reproduce a plurality of moving images or a plurality of still images or both. For example, a mobile phone, a smartphone, a tablet information terminal, a notebook information terminal, or a computer may be employed. In the present exemplary embodiment, a moving image file and a still image file may be generically referred to as an image file. In the present exemplary embodiment, a moving image and a still image may be generically referred to as an image. In the present exemplary embodiment, moving image data and still image data may be generically referred to as image data.

The imaging apparatus according to the present exemplary embodiment can extract, even when images acquired by a first imaging unit and a second imaging unit are combined to be recorded, only the image captured by the second imaging unit to display the image. Hereinafter, such an imaging apparatus will be described.

<Overall Configuration>

First, a configuration of an imaging apparatus 100 according to a first exemplary embodiment will be described with reference to FIG. 1.

As illustrated in FIG. 1, the imaging apparatus 100 according to the present exemplary embodiment includes a CPU 101, a random access memory (RAM) 102, a read-only memory (ROM) 103, and an operation unit 104. The imaging apparatus 100 includes a first imaging unit 110, an image processing unit 111, a second imaging unit 112, a sound collecting unit 120, and a sound processing unit 121. The imaging apparatus 100 includes a display unit 140, a display control unit 141, a recording/reproducing unit 150, a recording medium 151, and an attitude detection unit 160.

In the imaging apparatus 100 according to the present exemplary embodiment, the CPU 101 loads, using the RAM 102 as a work memory, various kinds of programs recorded in the ROM 103 into the RAM 102, and controls respective blocks of the imaging apparatus 100 according to the programs. The operation unit 104 includes switches for inputting various types of operations, such as a power button, a recoding button, a zoom adjusting button, an autofocus button, a menu display button, a mode switching button, and a determination button. The operation unit 104 may be any type of operation devices such as a curser key, a pointing device, a touch panel, or a dial. The operation unit 104 transmits an operation signal to the CPU 101 when a user operates such a key, a button, or a touch panel. The operation members of the operation unit 104 are assigned functions according to respective scenes by selecting various types of functional icons displayed on the display unit to function as various types of functional buttons. The functional buttons are, for example, an end button, a return button, an image feed button, a jump button, a narrowing-down button, and an attribute change button. For example, when the menu button is pressed, menu screens via which various settings can be made are displayed on the display unit. The user can intuitively execute various settings by using the menu screen displayed on the display unit, an up-and-down and left-and-right four-way button, or a SET button. The operation unit 104 may be a touch panel capable of detecting touching on the display unit. For the touch panel, any one of touch panels of various types such as a resistive film type, a capacitance type, a surface acoustic wave type, an infrared-ray type, an electromagnetic induction type, an image recognition type, and an optical sensor type may be used.

Each of the first imaging unit 110 and the second imaging unit 112 controls a light amount by a diaphragm to convert an optical image of an object captured through a lens into an image signal by using an image sensor such as a charge coupled device (CCD) sensor or a complementary metal-oxide semiconductor (CMOS) sensor. Each of the first imaging unit 110 and the second imaging unit 112 converts an acquired analog signal into a digital image signal to temporarily store the signal in the RAM 102. The image processing unit 111 processes image data stored in the RAM 102 during recording, and processes image data read from the recording medium 151 described below during reproduction. The image processing unit 111 performs various processes for the image data, such as white balance adjustment, gain adjustment, and color emphasis processing. The image processing unit 111 transmits the processed image data to the display control unit 141 or to the recording/reproducing unit 150 or a communication unit. The image processing unit 111 can compress an image as a moving image by using a moving-image compression technology such as H, 264/Advanced Visual Communication (AVC) or Motion Joint Photographic Experts Group (JPEG) 2000, H. 265, or compress an image as a still image by using a still-image compression technology such as JPEG or JPEG 2000. The compression method is not limited thereto, and other methods can be used.

The image processing unit 111 according to the present exemplary embodiment can detect whether the images include an image corresponding to a person or a face, and detect an expression by analyzing the images acquired by the first and second imaging units 110 and 112. Various detection methods are available, and detection can be performed by using pattern matching with a feature image of the person or the face. When the face is detected, a size and a position are stored in the RAM 102. When the face is detected, an edge of a face image is detected to determine a smile level. Such detection information is stored in a header or the like of an image file including target image data when a still image or a moving image is captured.

The sound processing unit 121 processes sound data acquired by collecting sounds by the sound collecting unit 120 during recording, and processes sound data read from the recording medium 151 described below, compressed or uncompressed during reproduction. For example, the sound processing unit 121 performs level adjustment processing of the sound data, decompression processing of the compressed sound data, or compression processing of the sound data. The sound processing unit 121 transmits the processed sound data to the recording/reproducing unit 150 or the communication unit, and transmits the sound data to the speaker during reproduction. The sound collecting unit 120 is, for example, a microphone included in a housing of the imaging apparatus 100 to collect a plurality of nondirectional sounds. In the sound processing unit 121, as a sound compression method, a known general sound compression method such as Audio Code number 3 (AC 3) or Advanced Audio Coding (AAC) is used.

The display unit 140 includes, for example, a liquid crystal display device or an organic electroluminescence (EL) display device, and displays an image under control of the display control unit 141. For the display unit 140, any unit such as a light-emitting diode (LED) display can be used as long as the unit can provide an image to the user. The display unit 141 displays an image on the display unit 140 based on the image data processed by the image processing unit 111. The display control unit 141 may execute image signal processing such as matrix conversion, brightness adjustment, contrast adjustment, gamma adjustment, chroma gain adjustment, or sharpness adjustment for a video signal based on a digital image signal to be displayed on the display unit 140.

The recording/reproducing unit 150 records the image data and the sound data processed by the image processing unit 111 in the recording medium 151 during recording, and reproduces the image data or the sound data recorded in the recording medium 151 during reproduction. The recording/reproducing unit 150 writes, during recording, an imaging date, information regarding compression, or various types of information such as setting of the imaging unit 110 together with the image data or the sound data, into the recording medium 151. When the image data or the sound data is recorded in the recording medium 151, the recording/reproducing unit 150 records the data in the recording medium 151 as a file compliant to a file format such as File Allocation Table (FAT) or exFAT. The recording medium 151 may be a recording medium included in the imaging apparatus or a removable recording medium. Recording media of all types such as a hard disk, an optical disk, a magneto-optical disk, a compact disc-recordable (CD-R), a DVD-recordable (DVD-R), a magnetic tape, a nonvolatile semiconductor memory, and a flash memory are included. When the removable recording medium is used, the recording/reproducing unit 150 has a mechanism for loading or discharging the removable recording medium.

The attitude detection unit 160 configured to detect an attitude of the imaging apparatus 100 is, for example, an angle sensor or an acceleration sensor. The attitude detection unit 160 according to the present exemplary embodiment detects which of a normal position (i.e., landscape) and a longitudinal position (i.e., portrait) the attitude of the imaging apparatus 100 is in. For example, the attitude detection unit 160 can detect a rotational attitude angle (0°, 90°, 180°, or 270°) around an optical axis of the first imaging unit 110 of the imaging apparatus 100. "0°" indicates a normal position (state where top surface of imaging apparatus 100 is oriented in the sky direction), and "180°" indicates the opposite position thereof (state where top surface of imaging apparatus 100 is oriented in the ground direction). "90°" and "270°" are longitudinal positions (state where one of left and right surfaces of imaging apparatus 100 is oriented in the ground direction).

The first imaging unit 110 and the second imaging unit 112 according to the present exemplary embodiment respectively capture images of objects located in different directions. More specifically, the second imaging unit 112 is a sub-camera for capturing an image of a photographer (camera operator), and the first imaging unit 110 is a main camera for capturing an image of a target to be imaged (object). Accordingly, for example, the first imaging unit 110 and the second imaging unit 112 are not necessarily configured to capture images in opposite directions.

The image processing unit 111, the sound processing unit 121, the display control unit 141, and the recording/reproducing unit 150 may be microcomputers including programs used to execute the aforementioned functions. The CPU 101 may load the program for executing the above-described processing recorded in the ROM 103 into the RAM 102 and execute it.

<Operation of Imaging Apparatus 100>

Next, an operation of the imaging apparatus 100 according to the present exemplary embodiment will be described. The imaging apparatus 100 according to the present exemplary embodiment has a "still-image capturing mode", a "moving-image capturing mode", a "reproducing mode", and a "moving-image/still-image capturing mode". In each mode, the CPU 101 controls each block of the imaging apparatus 100 to execute the following operation.

In the "still-image capturing mode" and the "moving-image capturing mode", until an imaging instruction is input, only an image acquired by the first imaging unit 110 or an image generated by combining the image acquired by the first imaging unit 110 and an image acquired by the second imaging unit 112 is displayed on the display unit 140. In other words, the display control unit 141 is controlled to process the image acquired by each imaging unit by the image processing unit 111 and to display the processed image on the display unit 140. When the imaging instruction has been input, the image processing unit 111 is controlled to compress the image acquired by each imaging unit as a moving image or a still image, and the recording/reproducing unit 150 is controlled to sequentially record the compressed images in the recording medium 151. In the "still-image capturing mode", the image processing unit 111 is controlled to compress one or a plurality of images acquired by each imaging unit by using, for example, JPEG, at a timing corresponding to the imaging instruction. The recording/reproducing unit 150 is controlled to record the compressed still image data as a still image file in the recording medium 151. In the "moving-image capturing mode", the image processing unit 111 is controlled to compress a moving image in which images sequentially acquired from images obtained by each imaging unit are frame images by using, for example, H. 265, at a timing corresponding to the imaging instruction. The recording/reproducing unit 150 is controlled to record the compressed moving image data as a moving image file in the recording medium 151. In the "moving-image capturing mode", this operation is continued until an imaging end instruction is input. In the "still-image capturing mode" and the "moving-image capturing mode", thumbnail images (still image data) generated based on the images captured in the respective modes are added to the still image file and the moving image file, and then the files are recorded in the recording medium 151.

In the "moving-image/still-image capturing mode", when a still image recording instruction is input, still image capturing and still image recording are carried out, and moving image data for a period of four seconds immediately before the inputting of the still image recording instruction is recorded in the recording medium. In the "moving-image/still-image capturing mode", when a plurality of still image recording instructions is input on the same day, moving image data for a period of four seconds immediately before the inputting of the still image recording instruction is added to one moving image file to be recorded. Accordingly, the moving image data for one day immediately before the still image capturing is stored in one moving image file, and viewing performance can be improved. In the "moving-image/still-image capturing mode", the CPU 101 displays, until an imaging instruction is input, only the image acquired by the first imaging unit 110 or the image generated by combining the image acquired by the first imaging unit 110 and the image acquired by the second imaging unit 112 on the display unit 140. In other words, the display control unit 141 is controlled to process the image acquired by each imaging unit by image processing unit 111 and display the processed image on the display unit 140. The image processing unit 111 sequentially compresses only the image acquired by the first imaging unit 110 or the image generated by combining the image acquired by the first imaging unit 110 and the image acquired by the second imaging unit 112 as moving image data, and temporarily stores the image in the RAM 102. The CPU 101 manages information in the RAM 102 so as to always store compressed moving image data of latest four seconds. For example, moving image data other than that of the latest four seconds may be discarded. Then, when a still image recording instruction is input, the image processing unit 111 is controlled to compress one or a plurality of images acquired by each imaging unit by using, for example, JPEG, at a timing corresponding to the instruction. The recording/reproducing unit 150 is controlled to record the still image data compressed as a still image in the recording medium 151. The recording/reproducing unit 150 is controlled to record the compressed moving data of latest four seconds stored in the RAM 102 in the recording medium 151 in response to the still image recording instruction. The image processing unit 111 is controlled to compress an image acquired in response to the still image recording instruction as a moving image (stop motion), and to record the image in the recording medium 151 so as to be reproduced after the moving image of the latest four seconds. Accordingly, in the recording/reproducing unit 150, the moving image data of the image acquired in response to the still image recording instruction is included in the same moving image file as that of the moving image of the latest four seconds recorded in the recording medium. Information regarding an operation during capturing of the moving data to be recorded or information regarding a detection position, a size, or a smile level of a human face may be stored in a header of a corresponding still image file. Information as to whether any stop motion moving image has been generated may be stored in the header of the still image file. When the composite image generated by combining the image acquired by the first imaging unit 110 and the image acquired by the second imaging unit 112 is recorded, a combining position or size of the image acquired by the second imaging unit 112 can be designated by the user. Then, the CPU 101 records composite information indicating the designated combining position or size of the image acquired by the second imaging unit 112 together with the composite image in the recording medium. The composite information may be recorded in, for example, chapter management information for managing chapters in the moving file included in the moving image data or as additional information of an image of each frame in the moving image data.

In the "reproduction mode", the recording/reproducing unit 150 is controlled to read a file list or thumbnail images of the moving image files or the still image files recorded in the recording medium 151. Then, the display control unit 141 is controlled to decompress, by the image processing unit 111, the thumbnail image of each file reproduced by the recording/reproducing unit 150, and display the decompressed thumbnail image on the display unit 140. The CPU 101 controls the display control unit 141 to decompress, by the image processing unit 111, the still image file or the moving image file corresponding to the thumbnail image selected by the user operating the operation unit 104, and display the acquired image on the display unit 140.

<Moving-Image/Still-Image Capturing Mode>

The "moving-image/still-image capturing mode" according to the present exemplary embodiment will be described in detail with reference to FIGS. 2A and 2B. FIGS. 2A and 2B are flowcharts illustrating an operation of the imaging apparatus 100 in the "moving-image/still-image capturing mode". Processing illustrated in FIG. 2 is performed by the CPU 101 controlling each block of the imaging apparatus 100.

First, in step S201, the CPU 101 acquires an operation state of each block of the imaging apparatus 100. In other words, the operation state of each block of the imaging apparatus 100 before a still image recording instruction is input. For example, an attitude of the imaging apparatus 100 detected by the attitude detection unit 160 is acquired. In addition, information regarding a focus operation of the first imaging unit 110 and information regarding a zoom operation are acquired. The information regarding the focus operation is information indicating whether a focus lens of the first imaging unit 110 is currently driven, and the information regarding the zoom operation is information indicating whether the zoom lens of the first imaging unit 110 is currently driven. These pieces of information may be acquired from the imaging unit 110 by the CPU 101, or control history of the driving of the imaging unit 110 by the CPU 101 itself may be stored. At this time, an image signal acquired by the first imaging unit 110 is processed by the image processing unit 111. The CPU 101 controls the image processing unit 111 to analyze the acquired image, determine whether the image includes any feature image such as a person or a face by pattern matching, and determine a "smile level" when the face is detected. The "smile level" is determined to be higher, by analyzing the eye and the mouth in the face image, as an angle formed between a line normal to a line connecting an image corresponding to the eye and a line connecting an end of the image corresponding to the mouth with a center thereof is smaller, and determined to be lower as the angle is larger. A determination method of the "smile level" is not limited to this method. The CPU 101 stores the information thus acquired for a predetermined period of time, for example, in units of one second or 0.5 second. These pieces of information are recorded as additional information in a still image file including the still image data corresponding to the still image recording instruction through processing described below.

In step S202, the CPU 101 acquires the setting information of the second imaging unit 112 stored in the RAM 102. The setting information of the second imaging unit 112 includes information indicating whether imaging by the second imaging unit 112 is "enabled" or "disabled", and information indicating a "combining position" or a "combining size" when the image acquired by the second imaging unit 112 is superimposed on the image acquired by the first imaging unit 110. These are set by the user in imaging or before imaging.

In step S203, the CPU 101 determines whether the imaging by the second imaging unit 112 is "enabled" based on the setting information of the second imaging unit 112 acquired in step S202.

When the imaging by the second imaging unit 112 is determined to be "enabled" (YES in step S203), in step S204, the CPU 101 controls the image processing unit 111 to generate an image by combining the image acquired by the first imaging unit and the image acquired by the second imaging unit. A combining position of the image acquired by the second imaging unit 112 is a position determined based on the composite information ("combining position" or "combining size") stored in the RAM 102.

When the imaging by the second imaging unit 112 is not determined to be "enabled" (NO in step S203), in step S205, the CPU 101 controls the image processing unit 111 to generate an image acquired by the first imaging unit.

After steps S204 and S205, in step S206, the CPU 101 controls the image processing unit 111 to compress the generated image as moving image data. Accordingly, moving image data in which the image generated in step S204 or S205 is a frame image is generated. The CPU 101 temporarily stores the compressed moving image data in the RAM 102. Similarly, in sound processing, the CPU 101 controls the sound processing unit 121 to process a sound signal acquired by the sound collecting unit 120, and temporarily store the processed sound signal in the RAM 102 in association with the moving image data. The CPU 101 controls the image processing unit 111 to execute size changing or gamma adjustment for the image acquired in step S204 or S205, and controls the display control unit 141 to display the acquired image on the display unit 140. Thus, until a still image capturing instruction is input, the image acquired by each imaging unit can be compressed as moving image data to be buffered in the RAM 102, and the image can be displayed on the display unit 140. The display control unit 141 is controlled to display the image generated in step S204 or S205 on the display unit 140.

In step S207, the CPU 101 determines whether an instruction of changing the mode to a mode other than the "moving-image/sill-image capturing mode" or tuning OFF power has been input via the operation unit 104.

When it is determined that the mode changing instruction has been input (YES in step S207), in step S208, the CPU 101 controls the image processing unit 111 to stop the operation of compressing the image acquired by each imaging unit as a moving image. In step S209, the moving image data and the sound data stored in the RAM 102 and the information of the operation state of each block of the imaging apparatus 100 are deleted, and the processing of the "moving-image/sill-image capturing mode" is ended.

When it is determined that no mode changing instruction has been input (NO in step S207), in step S210, the CPU 101 determines whether the operation state of each block of the imaging apparatus 100 has changed, or whether the setting information of the second imaging unit 112 has changed. The CPU 101 may determine whether only one of the operation states of the respective blocks of the imaging apparatus has changed, or whether setting of a part of the setting information of the second imaging unit 112 has changed. In the present exemplary embodiment, determination is made as to whether the attitude information has changed, whether the information indicating "enabled" or "disabled" of the second imaging unit 112 has changed, and whether the information indicating "display position" or "display size" during the superimposed displaying has changed. Determination may be made as to whether the composite information (information indicating "combining position" or "combining size") of the image of the second imaging unit 112 has changed.

When it is determined that the operation state of each block of the imaging apparatus 100 has changed or that the setting information of the second imaging unit 112 has changed (YES in step S210), in step S211, the CPU 101 deletes the moving image data and the sound data stored in the RAM 102 and the information about the operation state of each block of the imaging apparatus 100. Then, the processing returns to step S201. For example, this operation is carried out when the attitude information of the imaging apparatus detected by the attitude detection unit 160 has changed from "0°" to "90". This operation is also carried out when the setting of the second imaging unit 112 has changed from "enabled" to "disabled".

On the other hand, when it is determined that neither the operation state of each block of the imaging apparatus 100 has changed nor the setting information of the second imaging unit 112 has changed (NO in step S210), in step S212, the CPU 101 determines whether a SW 1 of a shutter button of the operation unit 104 has been turned ON. The shutter button of the imaging unit 100 according to the present exemplary embodiment is a two-stage switch. When the shutter button is half-pressed, the SW 1 is turned ON. When the shutter button is fully pressed, a SW 2 is turned ON. Thus, in step S212, the CPU 101 determines whether the shutter button has been half-pressed. When it is determined that the SW 1 of the shutter button of the operation unit 104 has not been turned ON (NO in step S212), the processing returns to step S201. In the present exemplary embodiment, the configuration example of the two-stage switch such as the shutter button is employed. However, the SW 1 and the SW 2 may be assigned to different buttons, or buttons corresponding to different user interfaces (UI) on the touch panel.

On the other hand, when it is determined that the SW 1 of the shutter button of the operation unit 104 has been turned ON (YES in step S212), in step S213, the CPU 101 causes the first imaging unit 110 to carry out a still image capturing operation. This processing includes, for example, autofocus (AF) processing, auto exposure (AE) processing, auto white balance (AW) processing, or emission processing of AF auxiliary light. When the SW 1 is ON, the imaging apparatus 100 according to the present exemplary embodiment neither executes determination in step S210, nor deletes any of the moving image data and the sound data buffered in the RAM 102, and the information of the operation state of each block of the imaging apparatus 100 even when the attitude of the imaging apparatus 100 has changed.

Then, in step S214, the CPU 101 determines whether the SW 2 of the shutter button of the operation unit 104 has been turned ON. In other words, in step S214, the CPU 101 determines whether the shutter button has been fully pressed. When it is determined that the SW 2 of the shutter button of the operation unit 104 has not been turned ON (NO in step S214), the processing returns to step S201.

On the other hand, when it is determined that the SW 2 of the shutter button of the operation unit 104 has been turned ON (YES in step S214), in step S215, the CPU 101 controls the first imaging unit 110 and/or the second imaging unit 112 to acquire an image for a still image. The CPU 101 controls the image processing unit 111 to stop the operation of compressing the image acquired by each imaging unit as the moving image, and controls the display control unit 141 to black out the displaying on the display unit 140.

In step S216, the CPU 101 carries out processing after imaging. The processing after imaging will be described below with reference to FIGS. 3A and 3B. The processing illustrated in FIGS. 3A and 3B is carried out by the CPU 101 controlling each block of the imaging apparatus 100.

In step S301, the CPU 101 controls the display control unit 141 to display the image for the still image acquired from each imaging unit in step S215 on the display unit 140, and controls the image processing unit 111 to compress the image as still image data. Then, the CPU 101 controls the recoding/reproducing unit 150 to record the still image data generated by the image processing unit 11 in the recording medium 151. The still image data is recorded as a still image file in the recording medium 151. In the present exemplary embodiment, the images respectively acquired by the first imaging unit 110 and the second imaging unit 112 are compressed as separate still image data. However, these images may be combined to be compressed as still image data.

In step S302, the CPU 101 determines whether the moving image data stored in the RAM 102 is moving image data of t0 seconds or longer.

When it is determined that the moving image data stored in the RAM 102 is moving image data of t0 seconds or longer (YES in step S302), in step S303, the CPU 101 controls the recording/reproducing unit 150 to record the moving image data and the sound data stored in the RAM 102 in the recording medium. The moving image data and the sound data are stored as moving image files in the recording medium 151. The CPU 101 stores information indicating an operation state of each block of the imaging apparatus 100, which has been stored in the RAM 102, as additional information in a header of a corresponding still image file. Accordingly, the operation state of each block of the imaging apparatus 100 during capturing of moving image data recorded in the recording medium 151 is recorded as the additional information of the corresponding still image file.

On the other hand, when it is determined that the moving image data stored in the RAM 102 is not moving image data of t0 seconds or longer (NO in step S302), in step S304, the CPU 101 deletes the moving image data and the sound data stored in the RAM 102 and the information indicating the operation state of each block of the imaging apparatus 100 from the RAM 102.

After step S303 or S304, in step S305, the CPU 101 determines whether the setting of the second imaging unit 112 is "enabled" or "disabled". In the imaging apparatus 100 according to the present exemplary embodiment, a generation method when the image acquired by the first imaging unit 110 in response to an instruction (i.e., SW 2 is ON) to record the still image to be generated thereafter is compressed as a moving image varies depending on the setting. This moving image enables the image acquired by the first imaging unit 110 to be continuously displayed by predetermined frames in response to turning-ON of the SW 2. In the present exemplary embodiment, this moving image is referred to as a stop motion. In the present exemplary embodiment, the image acquired by the second imaging unit 112 is not caused to be a stop motion. The images acquired by the second imaging unit 112 are sequentially combined during preview displaying of the image acquired by the first imaging unit 110. When the setting of the second imaging unit 112 is "enabled", a stop motion moving image is generated. When "disabled", the moving image data stored in the RAM 102 is t0 or longer before the SW 2 is turned ON. When stop motion setting is enabled, stop motion moving image is generated. On the other hand, in a case of "disabled", when the moving image data stored in the RAM 102 is shorter than t0 before the SW 2 is turned ON or when stop motion setting is disabled, no stop motion data is generated.

Figure 4A:
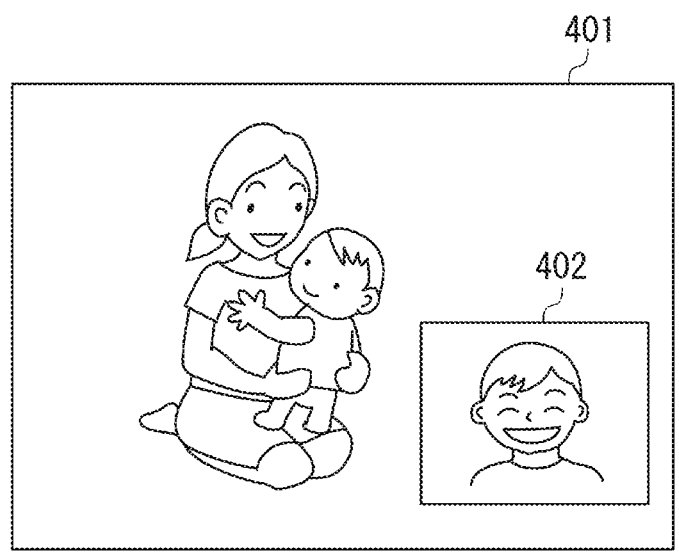
FIGS. 4A and 4B are diagrams each illustrating a display during stop motion displaying according to the present exemplary embodiment.
Figure 4B:
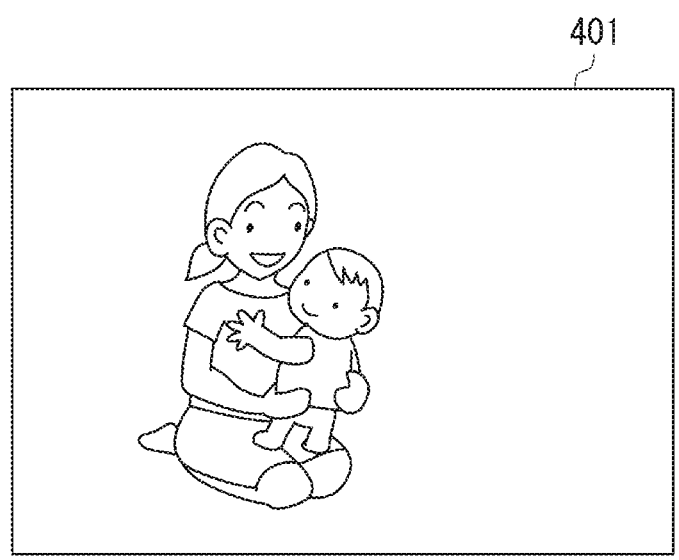

When the setting of the second imaging unit 112 is "enabled" (YES in step S305), in step S306, the CPU 101 controls the image processing unit 111 to generate a stop motion moving image. In this case, as described above, during the preview displaying of the image acquired by the first imaging unit 110 on the display unit 140 when the SW 2 is turned ON, the image acquired by the second imaging unit 112 is combined with the stop motion moving image. In other words, as illustrated in FIG. 4A, a stop motion moving image in which the image acquired by the second imaging unit 112 is superimposed as a moving image 402 on a stop motion 401 of the image acquired by the first imaging unit 110 is generated. Thus, in step S306, the CPU 101 controls the image processing unit 111 to execute processing for changing the image acquired by the first imaging unit 110 to a size for a stop motion moving image or the like when the SW 2 is turned ON.

In step S307, the CPU 101 controls the image processing unit 111 to generate an image by combining the image acquired by the second imaging unit 112 with the stop motion moving image generated in step S306.

In step S308, the CPU 101 controls the display control unit 141 to display the composite image generated in step S307 on the display unit 140.

In step S309, the CPU 101 controls the image processing unit 111 to set the composite image generated in step S307 as one frame of a moving image and compress the composite image as moving image data.

In step S310, the CPU 101 determines whether the stop motion time is t1 or longer. The processing of steps S307 to S308 is continued until the time of the stop motion moving image reaches t1 seconds. Through this processing, a stop motion moving image of t1 seconds is generated.

On the other hand, when the setting of the second imaging unit 112 is "disabled" (NO in step S305), in step S311, the CPU 101 determines whether the moving image stored in the RAM 102 has been deleted in step S304. When the moving image data has been deleted (YES in step S311), the processing after imaging is ended. Thus, the processing is ended without recording any of the moving image data immediately before the still image recording instruction and the moving image data of the stop motion moving image.

On the other hand, when the moving image data has not been deleted (NO in step S311), in step S312, the CPU 101 determines whether the setting of the stop motion moving image is enabled. When the setting of the stop motion moving image is not enabled (NO in step S312), the processing is ended without generating any stop motion moving image.

On the other hand, when the setting of the stop motion moving image is enabled (YES in step S312), in step S313, the CPU 101 controls the image processing unit 111 to generate a stop motion moving image. In step S313, the CPU 101 controls the image processing unit 111 to execute processing for changing the image acquired by the first imaging unit 110 to a size for a stop motion moving image or the like when the SW 2 is turned ON.

In step S314, the CPU 101 controls the display control unit 141 to display the composite image generated in step S313 on the display unit 140.

In step S315, the CPU 101 controls the image processing unit 111 to set the composite image generated in step S313 as one frame of a moving image and compress the composite image as moving image data.

In step S316, the CPU 101 continues the processing of step S315 until time of the stop motion moving image reaches t2 seconds. Through this processing, a stop motion moving image of t2 seconds is generated.

After steps S310 and S316, in step 317, the CPU 101 controls the recording/reproducing unit 150 to record the stop motion moving image generated by the image processing unit 111 in the recording medium 151. When moving image data of four seconds before turning-ON of the SW 2 has been recorded in the recording medium 151 in step S303, moving image data of the stop motion moving image is added to a moving image file in which the moving image data thereof has been stored.

Thus, the processing of step S216 is ended. After the end of the processing of step S216, basically, the processing is continued from step S201 without ending the moving-image/still-image capturing mode.

In the present exemplary embodiment, a relationship of t1>t2 is set. When the stop motion moving image is simply displayed, t2 is set. When a moving image depicting a change of a camera operator's expression during checking of an image corresponding to the stop motion moving image is combined with the stop motion moving image, t1 is set. Superimposing the moving image depicting the change of the camera operator's expression sets t1 to be longer than t2.

Next, a still image and a moving image recorded in the moving-image/still-image capturing mode will be described with reference to FIGS. 5A to 5C. FIG. 5A is a schematic diagram illustrating timing of turning ON the SW 2, and the still image and the moving image to be recorded, in the moving-image/still-image capturing mode. FIG. 5A illustrates the following status. The SW 2 is turned ON (release 1) at 15:16:20 on Oct. 10, 2013, and moving image data M1 (501) and still image data P1 (502) are recorded. The SW 2 is turned ON (release 2) at 15:30:45, and moving image data M2 (503) and still image data P2 (504) are recorded. The SW 2 is turned ON (release 3) at 15:40:30, and moving image data M3 (505) and still image data P3 (506) are recorded.

FIG. 5B is a schematic diagram illustrating contents of the moving image file and the still image file recorded in the recording medium 151. In the present exemplary embodiment, a file including data recorded on the same day is stored in one directory 511 (directory name: 100_1010). The directory name and each file name are determined according to Design rule for Camera FileSystem (DCF). As described above, the moving image data recorded in the moving-image/still-image capturing mode is added to one moving image file. In a moving image file 512 (moving image file name: MDG_0001. MOV), moving image data corresponding to each of three imaging operations carried out in the moving-image/still-image capturing mode on the same day illustrated in FIG. 5A is recorded, and a chapter is set in each moving image data. In other words, the moving image file MDG_0001. MOV includes moving image data corresponding to a plurality of scenes. The scenes respectively correspond to still image files IMG_0002. JPG, IMG_0003. JPG, and IMG_0004. JPG. A moving image captured in the normal moving image capturing mode is recorded as a separate moving image file.

Moving image data corresponding to a chapter 1 (514) is moving image data corresponding to an imaging instruction of the still image file IMG_0002. JPG, and the moving image data M1 illustrated in FIG. 5A. Moving image data corresponding to a chapter 2 (515) is moving image data corresponding to an imaging instruction of the still image file IMG_0003. JPG, the moving image data M2 illustrated in FIG. 5A, and stop motion moving image data generated from the same image as that of the still image data P2. Moving image data corresponding to a chapter 3 (516) is moving image data corresponding to the imaging instruction of the still image file IMG_0003. JPG, and the stop motion moving image data generated from the same image as that of the still image data P2. The moving image data illustrated in FIG. 5A is not included in the moving image data corresponding to the moving image data corresponding to the chapter 3 (516), because the moving image data M3 is moving image data of t0 seconds or shorter.

In the moving image file MDG_0001. MOV, "chapter reference information" of a moving image file including a plurality of moving image data is recorded in a header part. The chapter reference information is updated each time moving image data is recorded in the recording medium 151 in the moving-image/still-image capturing mode. The chapter reference information will be described referring to FIG. 5C. The chapter reference information includes a file size 521 of the moving image file, and the number of frames 522 of the moving image data included in the moving image file. The chapter reference information includes a set chapter number 523, capturing time 524 of moving image data corresponding to a chapter, a number 525 of a head frame of the moving image data corresponding to the chapter, and the number of frames 526 of moving image data corresponding to each chapter. The chapter reference information further includes a combining position 527 of the image of the second imaging unit 112 and a position 528 of stop motion moving image data in the moving image data corresponding to the chapter.

The chapter number 521 is added each time moving image data is recorded in the moving-image/still-image capturing mode. The capturing time 524 of the moving image data is time, day, month, and year when the SW 2 is turned ON in the moving-image/still-image capturing mode. In other words, the capturing time 524 is similar to capturing time of corresponding still image data recorded in the moving-image/still-image capturing mode. Setting the capturing time of each still image data and the capturing time of the moving image data of each chapter similar to each other facilitates identification of a corresponding chapter from the still image data.

The head frame number 525 of each chapter is a frame number of a head frame of each chapter in the entire moving image data recorded in the moving image file 512. Using the frame number facilitates cue reproduction of each moving image data. The composite information 527 of the image of the second imaging unit 112 includes, when upper left coordinates of the image of the first imaging unit 110 are (X, Y)=(0, 0), upper left coordinates X, Y (combining position) of the image of the second imaging unit 112, and a width W and a height H (combining size) of the image of the second imaging unit 112. In the chapter 1, values of the coordinates, the width, and the height of the image of the second imaging unit 112 are 0. In this case, imaging setting of the second imaging unit 112 is "disabled". Using the composite information (combining position and combining size 527) of the image of the second imaging unit 112 enables displaying of the trimmed (cut out) image of the second imaging unit 112.

The position 528 of the stop motion moving image data indicates a frame number of a stop motion moving image data part when a head frame of the moving image data of each chapter is 0. In the moving image data of the chapter 1, no stop motion moving image part is present. In a chapter 2, among 180 frames of the moving image data of the chapter 2, the latter 90-th to 179-th frames are stop motion moving images. In a chapter 3, among 180 frames of the moving image data of the chapter 3, all are stop motion moving images. Identifying the position of the stop motion moving image data facilitates reproduction of only a stop motion moving image part in the moving image data of each chapter, or reproduction of only a part other than the stop motion moving image.

The chapter reference information further includes identification information (registration number, identifier, name, nickname, and/or birthday) indicating a specific person or face identified by the image processing unit 111 during capturing of the image of the moving image data. The specific person or face may be detected in both of the image of the first imaging unit 110 and the image of the second imaging unit 112. The chapter reference information also includes information indicating a position or the number of faces identified by the image processing unit 111 during capturing of the image of the moving image data. The position or the number of faces identified by the image processing unit 111 during capturing of the image of the moving image data may be detected in both of the image of the first imaging unit 110 and the image of the second imaging unit 112.

In step S303, in the still image file recorded in the moving-image/still-image capturing mode, the additional information indicating the operation state of each block of the imaging apparatus 100 before inputting of the still image recording instruction, which has been stored in the RAM 102 in the moving-image/still-image capturing mode, is stored.

The operation state of each block of the imaging apparatus 100 before inputting of the still image recording instruction is acquired on a predetermined time unit basis, and additional information is generated based on this information. In the time axis, time when the SW 2 is turned ON is 0, and the operation state of each block of the imaging apparatus 100 before this time is stored for four seconds. The additional information (the operation state of each block of the imaging apparatus 100) includes attitude information of the camera 100, information about presence of an AF operation in the first imaging unit 110, information about presence of a zooming operation, and information about a smile level of an object of the main camera as information of the object. As the operation state of each block of the imaging apparatus 100, other items may be included. For example, by the image processing unit 111 analyzing each frame constituting the moving image data, the object, a position of the object, and a size of a face included in the moving image data may be included as items of the operation state of each block of the imaging apparatus 100. The additional information includes such information.

<Album Reproduction>

Figure 6:
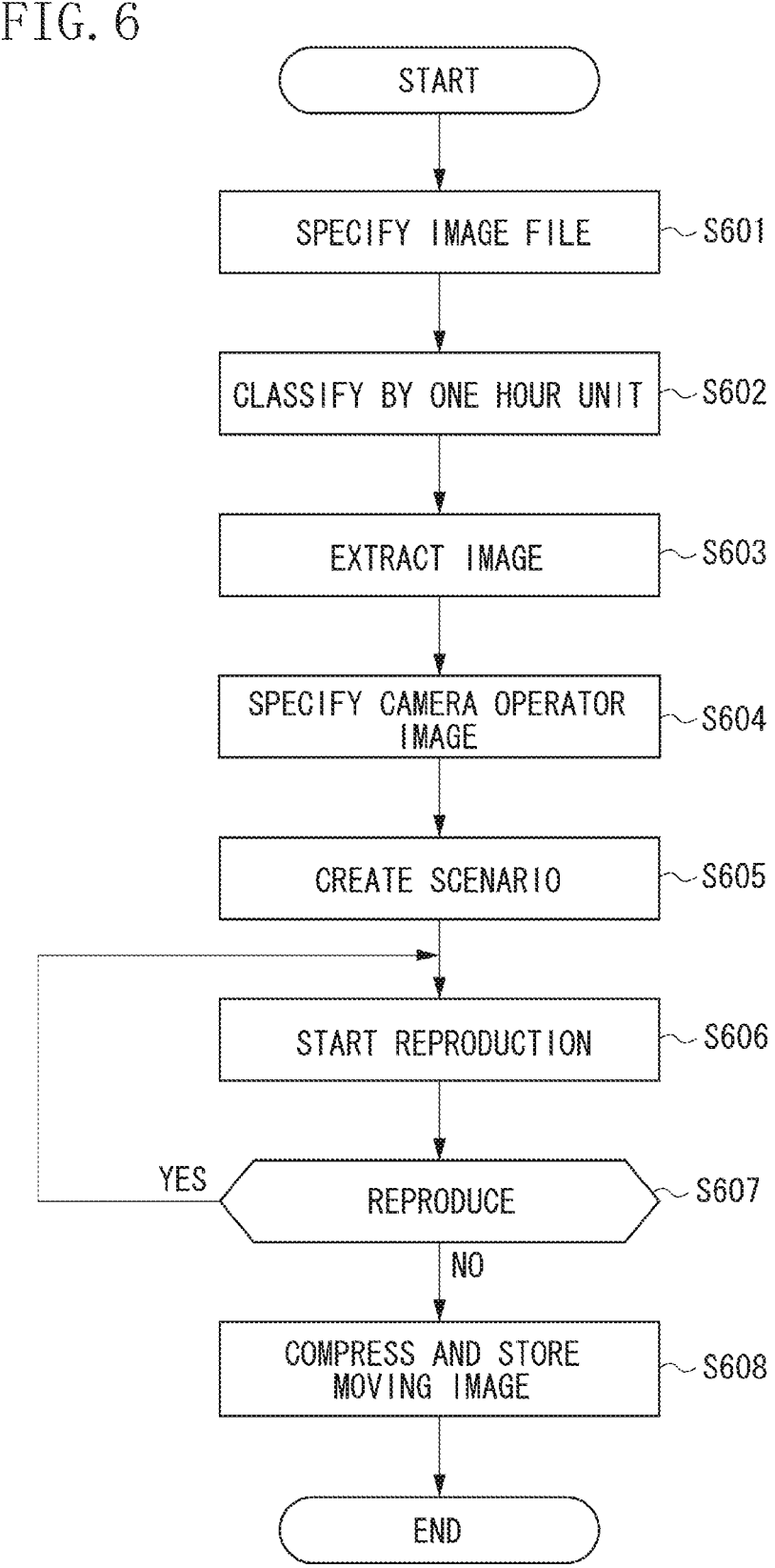
FIG. 6 is a flowchart illustrating an album reproduction operation according to the present exemplary embodiment.

The imaging apparatus 100 according to the present exemplary embodiment can select the "album reproduction" in the "reproduction mode". The "album reproduction" is a reproduction mode for extracting a predetermined number of images from a plurality of image data and displaying the extracted images. An operation of the imaging apparatus 100 in the "album reproduction" will be described referring to FIG. 6. A flowchart illustrated in FIG. 6 indicates processing executed by the CPU 101 controlling each block of the imaging apparatus 100. The "album reproduction" according to the present exemplary embodiment will be described by way of an example where a predetermined number of images is extracted from image data captured on a designated date. However, for example, a predetermined number of images may be extracted from an image associated with a designated person. A predetermined number of images may be extracted from an image data group where a user's evaluation value (favorite degree, rating) is high.

<Target Image Specification>

First, in step S601, when the "album reproduction" is designated, the CPU 101 acquires capturing date information of last reproduced image data. The CPU 101 specifies a still image file recorded in the still-image capturing mode and a still image file and a moving image file recorded in the moving-image/still-image capturing mode on the same day. Images included in the specified still image and moving image files are album reproduction targets.

In step S602, the CPU 101 classifies chapters of the specified still image and moving image files into one-hour groups (partial collection). In the case of group classification, the chapters may be simply divided by a one-hour unit. However, because of a possibility of continuous imaging, it is advisable to classify the chapters by a unit of about one hour by using the nearest neighbor method.

In step S603, the CPU 101 extracts images in classified group units. In the present exemplary embodiment, in a case of a still image, a still image of an extracted chapter is displayed for four seconds, and in a case of a moving image, a moving image of an extracted chapter is displayed (about four seconds in present exemplary embodiment). Target total reproduction time is about two minutes. In other words, the number of scenes of still and moving images is calculated as 2 (min)×60 (sec)÷2 (sec)=(scenes). In the present exemplary embodiment, in each group, moving and still images are separately evaluated to extract moving and still images evaluated high so that a ratio of scenes of the moving image to those of the still image can be 1:3 in each group. Display time of the still image is not fixed to four seconds. In the present exemplary embodiment, for easier description, the display time thereof is 4 seconds as in the case of the moving image.

A method for calculating an evaluation value of the moving image will be described. A calculation example of an evaluation value of a moving image belonging to a certain chapter will be described. An evaluation value MovieValue [M] of a chapter [M] is calculated by using information (face detection information) indicating positions or the number of faces in chapter reference information of the chapter [M]. More specifically, an evaluation value is calculated to be higher as the position of the face detected in the chapter [M] is closer to a center, and higher as the size of the face is larger. An evaluation value of the image captured by the second imaging unit 112 may be added. For example, an evaluation value is calculated by using information (face detection information) indicating positions or the number of faces of the image captured by the second imaging unit 112 in the chapter reference information of the chapter [M]. The calculated evaluation value is added to the evaluation value MovieValue [M]. In this way, the evaluation value of the moving image is calculated. For the still image, similarly, an evaluation value is calculated by using information about sizes, positions, or the number of faces in the image.

In step S604, the CPU 101 specifies a chapter of moving images including that used for camera operator displaying. During the camera operator displaying, only the image captured by the second imaging unit 112 is displayed. In the present exemplary embodiment, a scene with a high evaluation value of the image captured by the second imaging unit 112 in the chapter of the moving image extracted in step S603 is used for the camera operator displaying. Accordingly, the CPU 101 calculates an evaluation value of the image captured by the second imaging unit 112 based on the chapter reference information of the chapter extracted in step S603 and based on the positions or the number of faces in the image captured by the second imaging unit 112. Then, the CPU 101 specifies upper three chapters to be chapters of the moving images including the moving images used for the camera operator displaying.

When a "dictionary" associating a feature image for specifying a person or a face with an identifier has been stored beforehand in the imaging apparatus 100, a chapter including the person or the face registered in the "dictionary" may be preferentially selected in the image captured by the second imaging unit 112.

In step S605, the CPU 101 time-sequentially displays the moving and still images extracted in step S603, and creates an album scenario for displaying the cut-out image captured by the second imaging unit 112 of the chapter specified in step S604. In the present exemplary embodiment, a scenario is created so as to display the still image for four seconds.

In step S606, the CPU 101 displays the reproduced image on the display unit 140 according to the scenario created in step S605. When a still image corresponding to a still image file is displayed, the CPU 101 controls the recording/reproducing unit 150 to reproduce a still image file targeted for reproduction according to the scenario from the recording medium 151. The CPU 101 controls the image processing unit 111 to decompress an image of the reproduced still image and the display control unit 141 to display the image on the display unit 140. The display control unit 141 is controlled so as to display the image continuously for four seconds. When a moving image corresponding to the specified chapter is displayed, the CPU 101 specifies, according to chapter reference information of a moving image file included in the chapter, that the frames of the moving images in the chapter corresponds to the frames, from which frame to which frame thereof, of the moving images of the moving image file. The CPU 101 refers to a header of the moving image file to specify file offset of the target frame, and controls the recording/reproducing unit 150 to read the target moving image data from the recording medium 151. The CPU 101 controls the image processing unit 111 to decompress the read image data, and the display control unit 141 to sequentially display the read images on the display unit 140.

Lastly, processing when the camera operator displaying is carried out will be described. As described above, according to the present exemplary embodiment, when the second imaging unit 112 is "enabled" in the "moving-image/still-image capturing mode", the image captured by the first imaging unit 110 and the image captured by the second imaging unit 112 are combined, and compressed to be recorded as the moving image in the recording medium. Thus, to perform the camera operator displaying, a combining position and a combining size of the image captured by the second imaging unit 112 is to be specified. In the present exemplary embodiment, the composite information (combining position and combining size) of the image captured by the second imaging unit 112 is stored in the chapter reference information. Accordingly, image cutting-out (trimming) is carried out based on this information to extract an image. Thus, the CPU 101 specifies a moving image of a chapter including the moving image used for the camera operator displaying, which has been specified in step S604, according to the chapter reference information. The CPU 101 refers to a header of the moving image file to specify file offset of the target frame, and controls the recording/reproducing unit 150 to read the target moving image data from the recording medium 151. The CPU 101 controls the image processing unit 111 to decompress the read image data. Then, the CPU 101 specifies, based on the composite information (combining position and combining size) included in the chapter reference information, a region where the image captured by the second imaging unit 112 has been combined, and controls the image processing unit 111 to cut out (trim) the region. The CPU 101 controls the image processing unit 111 to combine text information of "camera operator" or the like with the cut-out image, and controls the display control unit 141 to display the combined image on the display unit 140. At this time, the cut-out image obtained from the image captured by the second imaging unit 112 may be moved to a screen center or magnified.

In step S607, the CPU 101 determines whether a reproduction instruction or a storage instruction has been input by the user. When it is determined that the reproduction instruction has been input (YES in step S607), the processing returns to step S606.

When it is determined that the storage instruction has been input (NO in step S607), in step S608, the CPU 101 controls the image processing unit 111 to generate moving image data usable to perform displaying according to the scenario, and controls the recording/reproducing unit 150 to record the image generated by the image processing unit 111 in the recording medium 151. At this time, the CPU 101 compresses the display image according to the scenario to generate moving image data by using a compression coding technique such as H. 264 or H. 265.

As described above, the imaging apparatus 100 according to the present exemplary embodiment can display an image of a high evaluation value from a plurality of image groups recorded in the recording medium 151 in the "album reproduction" and narrowed within a predetermined range or according to a predetermined condition. Moreover, the imaging apparatus 100 can generate moving image data for performing similar displaying. In particular, when the "camera operator displaying" is carried out, the composite information (combining position and combining size) of the image captured by the second imaging unit 112 has been stored in the chapter reference information, and thus image cutting-out (trimming) is carried out based on this information to extract an image.

Thus, the imaging apparatus according to the present exemplary embodiment can extract and display only the image captured by the second imaging unit even when the images captured by the first and second imaging units are combined to be recorded.

When the moving image data of the extracted chapter includes a stop motion moving image, a still image of the same image may not be extracted even when an evaluation value thereof is high.

Among a plurality of evaluation values, which evaluation value is used to determine an image with a highest priority may be set by a user.

The present exemplary embodiment has been described by taking the example of an imaging apparatus. However, any apparatus may be employed as long as the apparatus can reproduce a plurality of moving images or still images, or both. For example, a mobile phone, a smartphone, a tablet information terminal, a notebook information terminal, or a computer can be employed.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-272051 filed Dec. 27, 2013, which is hereby incorporated by reference herein in its entirety.

What is claimed is:

1. An imaging apparatus comprising a memory and at least one processor that executes a program to function as:
   a first imaging unit;
   a second imaging unit;
   a combining unit configured to generate a composite image by combining a first image captured by the first imaging unit and a second image captured by the second imaging unit;
   a recording unit configured to record the composite image generated by the combining unit and composite information regarding the combining of the first image and the second image in a recording medium; and a display control unit configured to perform control for displaying the image recorded in the recording medium on a display unit, wherein the display control unit performs control to extract the second image from the composite image and display the extracted second image, based on the composite information, wherein the first imaging unit is an imaging unit configured to capture an image of an object, and the second imaging unit is an imaging unit configured to capture an image of a photographer, wherein the display control unit displays the second image extracted from the composite image as the image of the photographer, and wherein the display control unit performs control to display text information together with the second image displayed as the image of the photographer.

2. The imaging apparatus according to claim 1, wherein the composite information includes a combining position of the second image.

3. The imaging apparatus according to claim 1, wherein the composite information indicates a size of the second image in the composite image.

4. The imaging apparatus according to claim 1, wherein the second image and the composite image are moving images.

5. The imaging apparatus according to claim 1, wherein the display control unit performs control to display the text information indicating that the second image is the image of the photographer together with the second image displayed as the image of the photographer.

6. A control apparatus comprising a memory and at least one processor that executes a program to function as:

a reading unit configured to read a composite image and composite information regarding the composite information from a recording medium, the composite image having been recorded in the recording medium by an imaging apparatus including a first imaging unit and a second imaging unit, and having been generated by combining a first image captured by the first imaging unit and a second image captured by the second imaging unit; and a display control unit configured to perform control to display the image read from the recording medium on a display unit, wherein the display control unit performs control to extract the second image from the composite image and display the extracted second image, based on the composite information, wherein the first image not combined with the second image is associated with the composite image and recorded in the recording medium, while the second image not combined with the first image is not recorded in the recording medium, and wherein the display control unit performs control to display text information together with the second image displayed as the image of a photographer.

7. The control apparatus according to claim 6, wherein the composite information includes a combining position and a combined size of the second image.

8. The control apparatus according to claim 6, wherein the second image includes a photographer who has captured the first image; and wherein the display control unit performs control to display text information indicating the photographer together with the second image.

9. The control apparatus according to claim 6, wherein the first image is a still image, and the second image is a moving image; and wherein the composite image is a moving image generated by combining the second image with a partial region of the first image.

10. The control apparatus according to claim 6, wherein the second image is a moving image and the composite image is a composite moving image.

11. The control apparatus according to claim 10, wherein a plurality of composite moving images according to a plurality of times of imaging is recorded as one moving image file in the recording medium; and wherein the composite information includes information regarding a period in the composite moving image in which the second image has been combined.

12. The control apparatus according to claim 6, further comprising a reproduction function for continuously reproducing a plurality of images, wherein in a case where the reproduction function is executed, the display control unit performs control to automatically select a plurality of images from a plurality of images recorded in the recording medium and continuously display the plurality of selected images; and wherein in the reproduction function, when the composite image in which the first image has been combined or the first image is displayed, the display control unit performs control to display the second image extracted from the composite image.

13. The control apparatus according to claim 12, wherein the second image includes a photographer who has captured the first image.

14. The control apparatus according to claim 12, further comprising a generation unit configured to generate moving image data in which the plurality of automatically selected images is continuously reproduced in the reproduction function.

15. A method for controlling an imaging apparatus including a first imaging unit and a second imaging unit, the method comprising:

generating a composite image by combining a first image captured by the first imaging unit and a second image captured by the second imaging unit;

recording the generated composite image and composite information regarding the combining of the first image and the second image in a recording medium; and performing control for displaying the image recorded in the recording medium on a display unit, wherein the control is performed to extract the second image from the composite image and display the extracted second image, based on the composite information, wherein the first imaging unit is an imaging unit configured to capture an image of an object, and the second imaging unit is an imaging unit configured to capture an image of a photographer, wherein the control is performed to display the second image extracted from the composite image as the image of the photographer, and wherein the control is performed to display text information together with the second image displayed as the image of the photographer.

16. A method for controlling a reproduction apparatus, the method comprising:

reading a composite image and composite information regarding the composite image from a recording medium, the composite image having been recorded in the recording medium by an imaging apparatus including a first imaging unit and a second imaging unit and having been generated by combining a first image captured by the first imaging unit and a second image captured by the second imaging unit; and performing control to display the image read from the recording medium, wherein the control is performed to extract the second image from the composite image and display the extracted second image, based on the composite information, wherein the first image not combined with the second image is associated with the composite image and recorded in the recording medium, while the second image not combined with the first image is not recorded in the recording medium, and wherein the control is performed to display text information together with the second image displayed as the image of a photographer.

17. A non-transitory storage medium storing a program capable of causing a computer comprising a memory and at least one processor that executes the program to function as each unit in an imaging apparatus comprising:

a first imaging unit;

a second imaging unit;

a combining unit configured to generate a composite image by combining a first image captured by the first imaging unit and a second image captured by the second imaging unit;

a recording unit configured to record the composite image generated by the combining unit and composite information regarding the combining of the first image and the second image in a recording medium; and a display control unit configured to perform control for displaying the image recorded in the recording medium on a display unit, wherein the display control unit performs control to extract the second image from the composite image and display the extracted second image, based on the composite information, wherein the first imaging unit is an imaging unit configured to capture an image of an object, and the second imaging unit is an imaging unit configured to capture an image of a photographer, wherein the display control unit displays the second image extracted from the composite image as the image of the photographer, and wherein the display control unit performs control to display text information together with the second image displayed as the image of the photographer.

18. A non-transitory storage medium storing a program capable of causing a computer comprising a memory and at least one processor that executes the program to function as each unit in a control apparatus comprising:

a reading unit configured to read a composite image and composite information regarding the composite information from a recording medium, the composite image having been recorded in the recording medium by an imaging apparatus including a first imaging unit and a second imaging unit, and having been generated by combining a first image captured by the first imaging unit and a second image captured by the second imaging unit; and a display control unit configured to perform control to display the image read from the recording medium on a display unit, wherein the display control unit performs control to extract the second image from the composite image and display the extracted second image, based on the composite information, wherein the first image not combined with the second image is associated with the composite image and recorded in the recording medium, while the second image not combined with the first image is not recorded in the recording medium, and wherein the display control unit performs control to display text information together with the second image displayed as the image of a photographer.

* * * * *